US012169189B2

(12) United States Patent
Takamine et al.

(10) Patent No.: US 12,169,189 B2
(45) Date of Patent: Dec. 17, 2024

(54) STRUCTURE EVALUATION SYSTEM, STRUCTURE EVALUATION APPARATUS, AND STRUCTURE EVALUATION METHOD

(71) Applicants: Kabushiki Kaisha Toshiba, Tokyo (JP); Kyoto University, Kyoto (JP)

(72) Inventors: Hidefumi Takamine, Shinagawa (JP); Yuki Ueda, Kawasaki (JP); Kazuo Watabe, Yokohama (JP); Tomoki Shiotani, Kyoto (JP)

(73) Assignees: Kabushiki Kaisha Toshiba, Tokyo (JP); Kyoto University, Kyoto (JP)

( * ) Notice: Subject to any disclaimer, the term of this patent is extended or adjusted under 35 U.S.C. 154(b) by 370 days.

(21) Appl. No.: 17/653,512

(22) Filed: Mar. 4, 2022

(65) Prior Publication Data

US 2022/0187253 A1 Jun. 16, 2022

Related U.S. Application Data

(63) Continuation of application No. PCT/JP2020/027652, filed on Jul. 16, 2020.

(51) Int. Cl.
*G01N 29/44* (2006.01)
*G01N 29/04* (2006.01)
*G01N 29/34* (2006.01)

(52) U.S. Cl.
CPC ....... *G01N 29/4445* (2013.01); *G01N 29/043* (2013.01); *G01N 29/045* (2013.01); *G01N 29/341* (2013.01)

(58) Field of Classification Search
CPC ............. G01N 29/4445; G01N 29/043; G01N 29/045; G01N 29/341; G01N 2291/0232;
(Continued)

(56) References Cited

U.S. PATENT DOCUMENTS

2017/0336365 A1* 11/2017 Watabe .............. G01N 29/2437
2017/0363586 A1 12/2017 Takamine et al.
2021/0181157 A1 6/2021 Takamine et al.

FOREIGN PATENT DOCUMENTS

CN 102269736 A 12/2011
EP 3 290 915 A1 3/2018
(Continued)

OTHER PUBLICATIONS

Extended European Search Report issued Jun. 5, 2024 in European Patent Application No. 20945193.9, citing reference 15 therein, 8 pages.

*Primary Examiner* — Xin Y Zhong
(74) *Attorney, Agent, or Firm* — Oblon, McClelland, Maier & Neustadt, L.L.P.

(57) ABSTRACT

According to one embodiment, a structure evaluation system according to an embodiment includes a plurality of sensors, a position locator, a corrector, and an evaluator. The plurality of sensors detect elastic waves generated from a structure. The position locator locates the position of a generation sources of a plurality of elastic waves on the basis of the plurality of elastic waves detected by the plurality of sensors. The corrector corrects information based on the position locating performed by the position locator using a correction value set in correspondence with an impact. The evaluator evaluates a deterioration state of the structure on the basis of the corrected information.

14 Claims, 10 Drawing Sheets

(58) Field of Classification Search
CPC ..... G01N 2291/0258; G01N 2291/106; G01N 29/4454; G01N 29/14; G01N 29/32
See application file for complete search history.

(56) References Cited

FOREIGN PATENT DOCUMENTS

| | | | |
|---|---|---|---|
| EP | 3 290 915 | B1 | 7/2020 |
| EP | 3 761 022 | A1 | 1/2021 |
| WO | WO 2017/217034 | A1 | 12/2017 |
| WO | WO 2019/167137 | A1 | 9/2019 |

* cited by examiner

STRUCTURE EVALUATION SYSTEM, STRUCTURE EVALUATION APPARATUS, AND STRUCTURE EVALUATION METHOD

This is a Continuation Application of International Application PCT/JP2020/027652, filed on Jul. 16, 2020, and the entire contents of all of which are incorporated herein by reference.

FIELD

Embodiments described herein relate generally to a structure evaluation system, a structure evaluation apparatus, and a structure evaluation method.

BACKGROUND

By disposing a sensor on the surface of a structure such as a bridge, an elastic wave generated inside the structure can be detected. In addition, by disposing a plurality of sensors on the surface of a structure, the position of the generation source of elastic waves (hereinafter, referred to as an "elastic wave source") can be located on the basis of a difference in arrival times of elastic waves detected by the plurality of sensors. Also in a case in which an impact is applied to the surface of a structure from the outside, an elastic wave is generated inside the structure. For this reason, the position of an elastic wave source can be located.

In a case in which there is damage on a propagation path of elastic waves, the propagation of the elastic waves may be disturbed. In such a case, the accuracy of a result of locating the elastic wave source may become degraded. In a case in which elastic waves are detected using sensors disposed facing each other when a spatially uniformly impact is being applied to the surface of a structure, such as during collision of raindrops on a road surface at the time of rainfall, the density of elastic wave sources is observed to be low in an area having internal damage. By using such characteristics, damage inside a structure can be detected. In a case in which a technique of imparting a uniformly applied impact to the surface of a structure is used, the distribution of elastic wave sources becomes uniform when there is no damage inside the structure. In this technique, it is premised that an impact, which is uniformly given, is applied to the surface of a structure. For this reason, in a case in which an impact applied to the surface of a structure is not uniform, the accuracy of evaluation may be degraded.

DETAILED DESCRIPTION

The present invention provides a problem to be solved by the present invention is to provide a structure evaluation system, a structure evaluation apparatus, and a structure evaluation method capable of improving an accuracy of evaluating a structure even in a case in which an impact applied to the surface of the structure is not uniform.

According to one embodiment, a structure evaluation system according to an embodiment includes a plurality of sensors, a position locator, a corrector, and an evaluator. The plurality of sensors detects elastic waves generated from a structure. The position locator locates the position of a generation sources of a plurality of elastic waves on the basis of the plurality of elastic waves detected by the plurality of sensors. The corrector corrects information based on the position locating performed by the position locator using a correction value set in correspondence with an impact. The evaluator evaluates a deterioration state of the structure on the basis of the corrected information.

Hereinafter, a structure evaluation system, a structure evaluation apparatus, and a structure evaluation method according to embodiments will be described with reference to the drawings.

(Overview)

A structure evaluation system according to an embodiment is a system capable of improving an accuracy of evaluation of a structure even in a case in which an impact applied to the surface (hereinafter, referred to as a "road surface") of the structure is not spatially uniform. A case in which an impact applied to a road surface is not spatially uniform is a case in which the position of the impact applied inside a predetermined space is biased. For example, as the case in which an impact applied to a road surface is not spatially uniform, as illustrated in FIG. 1, a case in which a vehicle 10 is passing over a road surface (the surface of a structure 50) may be assumed.

Figure 1:
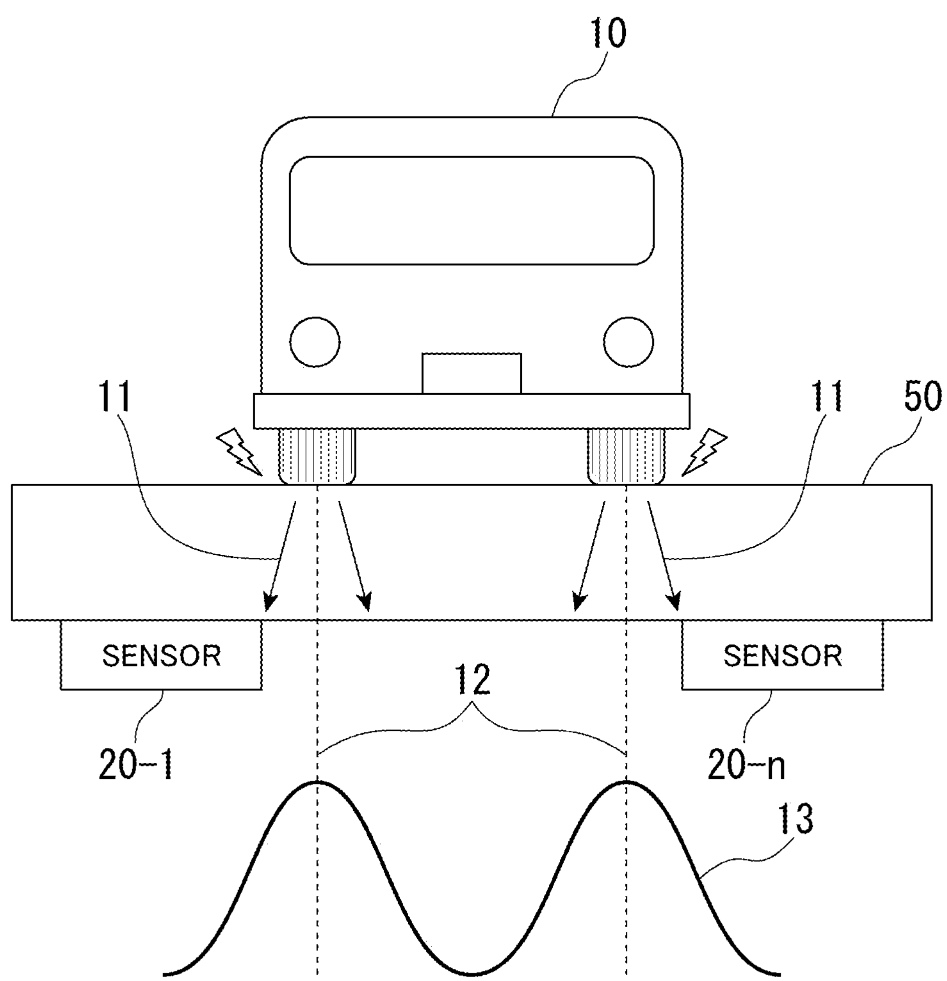
FIG. 1 is a diagram illustrating an overview of a structure evaluation system according to an embodiment.

FIG. 1 is a diagram illustrating an overview of a structure evaluation system according to an embodiment. In a situation as illustrated in FIG. 1, loads are applied to a road surface in accordance with contact between running parts of a vehicle 10 (for example, tires) and the road surface. The loads on the road surface are applied by running parts of the vehicle 10. In this way, the running parts of the vehicle 10 give impacts to the road surface. As a result, elastic waves 11 are generated inside the structure 50. On the other hand, no impact is applied to areas of the road surface over which the running parts of the vehicle 10 do not pass.

The elastic waves 11 are generated with positions 12 through which the running parts of the vehicle 10 pass as respective centers. The elastic wave 11 propagates inside the structure 50 with the position 12 as a start point. The elastic wave 11 propagating through the inside of the structure 50 is detected by a plurality of sensors 20-1 to **20-*n* (here, n is an integer equal to or larger than 3). A position through which the vehicle 10 passes is different for each vehicle. However, it can be assumed that many vehicles 10** will pass over certain fixed positions in accordance with a width of the road.

Thus, a frequency distribution of positions to which impacts due to passage of running parts of a plurality of vehicles 10 are applied, for example, can be represented as a distribution 13 illustrated in a lower part of FIG. 1. In the distribution 13, the horizontal axis represents a range of a road width, and the vertical axis represents a frequency at which impacts are applied. As illustrated in the distribution 13, the frequency at which impacts are applied is the highest at positions 12 through which running parts of the vehicle 10 are assumed to pass. On the other hand, as the position becomes further away from the position 12, a frequency at which impacts are applied becomes lower.

It is assumed that a distribution representing a density of elastic wave sources (hereinafter referred to as an "elastic wave source density distribution") is generated using a conventional technique on the basis of a result of detection of elastic waves 11 obtained under the situation illustrated in FIG. 1. The elastic wave source density distribution obtained in this case is a distribution having a bias such that the density of elastic wave sources is equal to or higher than a threshold (for example, a dense state) at a position at which a passage frequency of running parts of the vehicle 10 is high, and the density is lower than the threshold (for example, a sparse state) at a position at which a passage frequency of running parts of the vehicle 10 is low.

In this way, an elastic wave source density distribution obtained in a case in which impacts applied to the road surface are not spatially uniform has a trend that the density of elastic wave sources is low in a case in which there is no damage in an area to which an impact is not applied, and the density of elastic wave sources is high in a case in which there is damage in an area to which an impact is applied. In other words, there is a high likelihood of the density of elastic wave sources being lower than the threshold in an area to which no impact is applied even in a case in which there is no damage, and there is a high likelihood of the density of elastic wave sources being equal to or higher than the threshold in an area to which an impact is applied even in a case in which there is damage. Thus, in a case in which impacts applied to a road surface are not spatially uniform, when a deterioration state of a structure 50 is evaluated using a conventional evaluation technique, an area having no damage inside the structure 50 may be evaluated as a damaged area, and an area having damage inside the structure 50 may be evaluated as a sound area.

A damaged area is an area in which deterioration has occurred inside the structure 50. An area in which deterioration has occurred is an area in which damage has occurred in a part of the inside of the structure 50. A sound area is an area in which it is assumed that there is no damage or there is a little influence according to damage even though damage has occurred. In the conventional evaluation technique, accuracy of evaluation of a deterioration state of the structure 50 is degraded as described above. The conventional evaluation technique is an evaluation technique in which an area of which a density of elastic wave sources is lower than a threshold is regarded as a damaged area. For example, the conventional evaluation technique is a technique disclosed, for example, in PCT International Publication No. WO 2017/217034.

Figure 2:
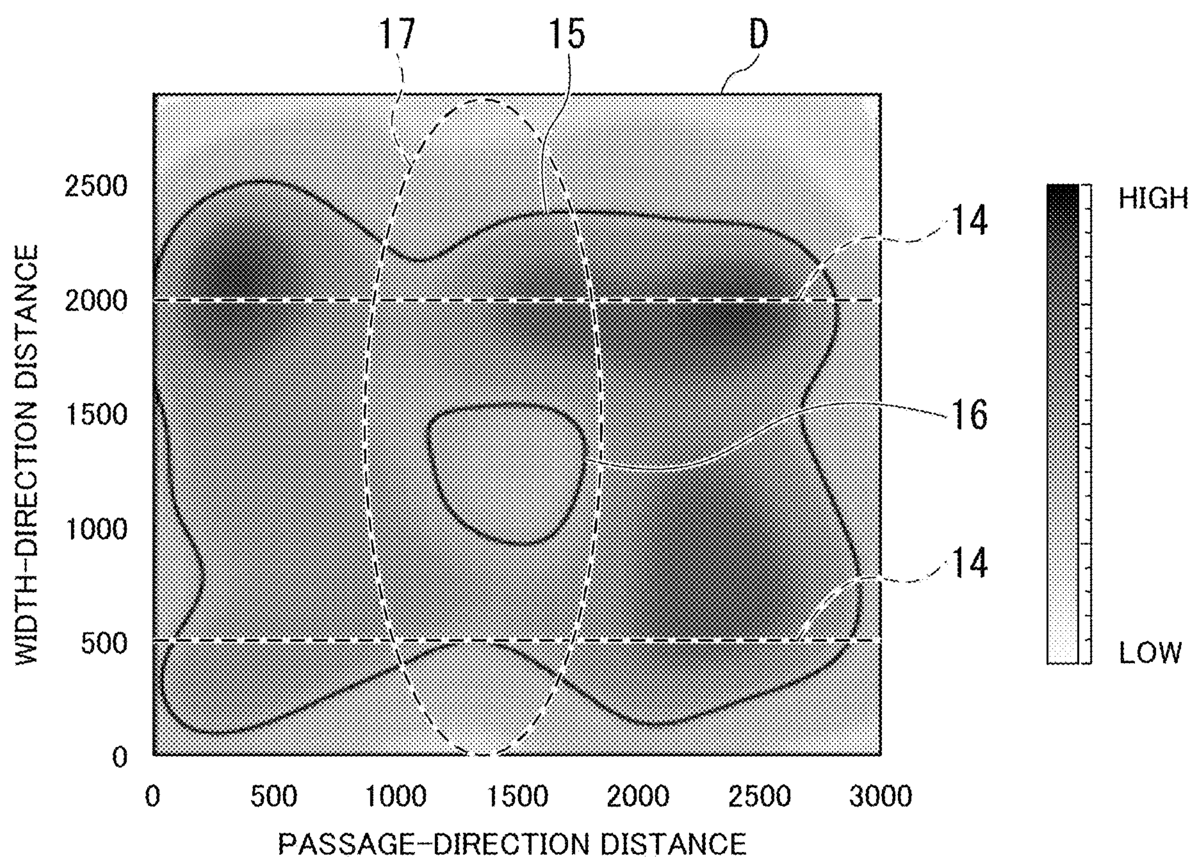
FIG. 2 is a diagram illustrating an example of an elastic wave source density distribution generated on the basis of detection results of elastic waves generated in accordance with impacts due to passage of running parts.

FIG. 2 is a diagram illustrating an example of an elastic wave source density distribution D generated on the basis of detection results of elastic waves 11 generated in accordance with impacts due to passage of running parts. In FIG. 2, the horizontal axis represents a distance in a passage direction of a vehicle, and the vertical axis represents a distance in a width direction. Dotted lines 14 illustrated on the elastic wave source density distribution D represent passage positions of the running parts of the vehicle 10. In a case in which an area of which a density is lower than a threshold 15 set in the elastic wave source density distribution D is evaluated as a damaged area using the conventional evaluation technique, an area 16 is evaluated as a damaged area. An actually damaged area is an area that is wider in the vertical direction as represented as an area 17 illustrated in FIG. 2. The reason for the degradation of the accuracy of evaluation like this is assumed to be the occurrence of a deviation in the density of elastic wave sources according to passage of the running parts of the vehicles 10, with the passage positions of the running parts of the vehicles 10 being the positions illustrated in FIG. 2.

Thus, the structure evaluation system according to the embodiment includes a plurality of sensors detecting elastic waves 11 generated inside the structure 50, a position locator locating positions of a plurality of elastic wave sources on the basis of the plurality of elastic waves 11 detected by the plurality of sensors, a corrector correcting information (for example, an elastic wave source density distribution) based on the position locating performed by the position locator using a correction value set in correspondence with an impact, and an evaluator evaluating a deterioration state of the structure 50 on the basis of corrected information.

In the structure evaluation system according to the embodiment, information based on position locating performed by the position locator is corrected using a correction value set in correspondence with an impact such that a deviation of the information is decreased. In accordance with this, erroneous diagnoses can be decreased. For this reason, even in a case in which impacts applied to a road surface are not uniform, the accuracy of evaluation of the structure 50 can be improved.

Hereinafter, details of the structure evaluation system 100 according to the embodiment will be described.

First Embodiment

Figure 3:
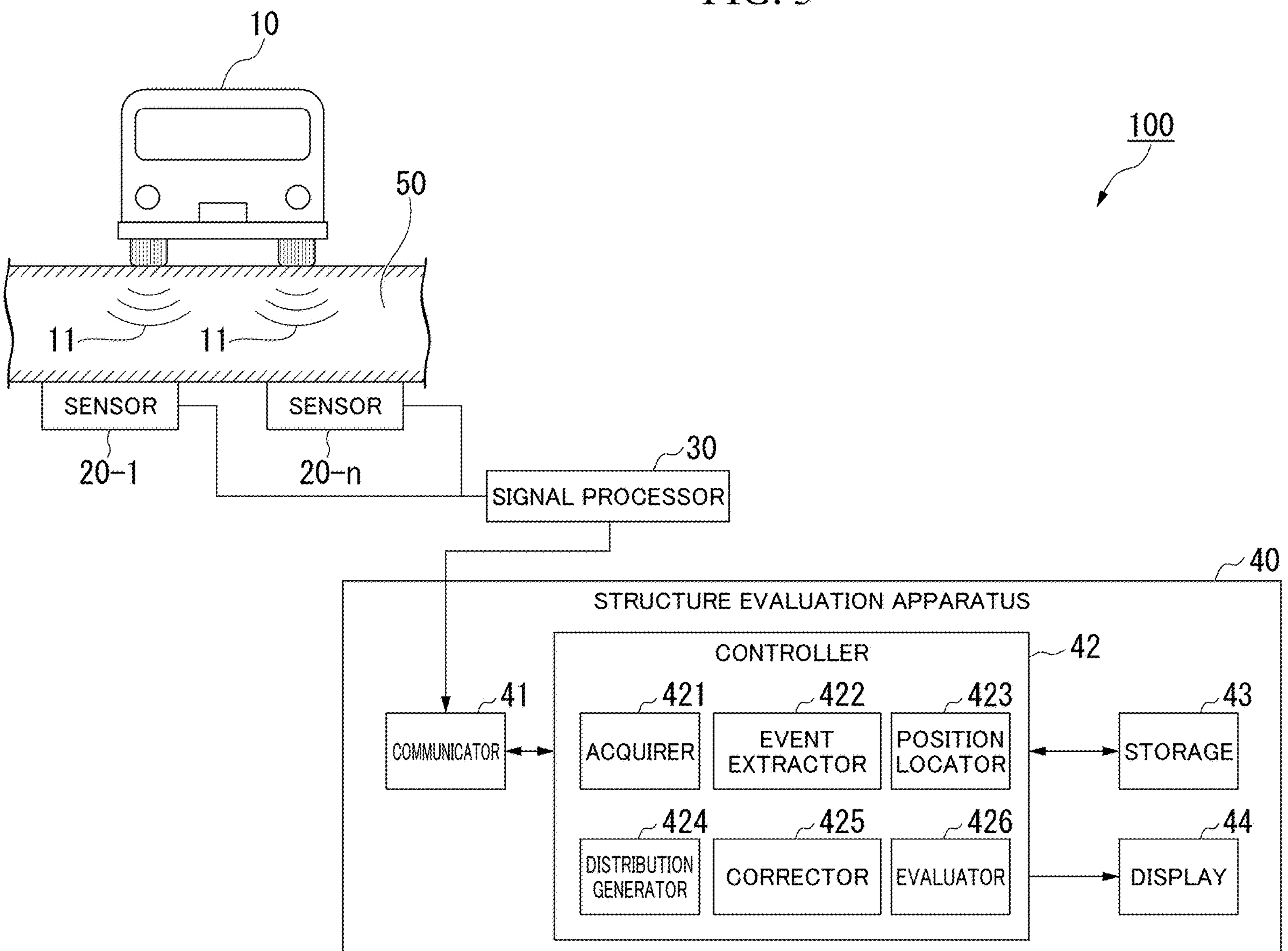
FIG. 3 is a diagram illustrating the configuration of a structure evaluation system according to a first embodiment.

FIG. 3 is a diagram illustrating the configuration of a structure evaluation system 100 according to a first embodiment.

The structure evaluation system 100 is used for evaluating soundness of the structure 50. In the following description, an evaluation represents determination of a degree of soundness of the structure 50, in other words, a deterioration state of the structure 50 on the basis of certain criteria.

In the following description, although a bridge composed of concrete will be described as an example of the structure 50, the structure 50 does not need to be limited to a bridge. The structure 50 may be any structure in which elastic waves 11 are generated in accordance with occurrence or progress of cracks or an external impact (for example, rain, artificial rain, or the like). For example, the structure 50 may be bedrock. In addition, the bridge is not limited to a structure that is installed above a river, a valley, or the like and includes various structures (for example, an elevated bridge of an expressway) and the like disposed above the ground surface. A thickness of the structure 50, for example, may be equal to or larger than 15 cm.

Examples of damage having an influence on an evaluation of the deterioration state of the structure 50 include damage inside the structure that disturbs propagation of elastic waves 11 such as a crack, a cavity, formation of sediment, or the like. Here, cracks include a vertical crack, a horizontal crack, a crack in an inclined direction, and the like. A vertical crack is a crack generated in the vertical direction with respect to the road surface. The horizontal crack is a crack generated in the horizontal direction with respect to the road surface. The crack in an inclined direction is a crack generated in a direction other than the horizontal direction and the vertical direction with respect to the road surface. The formation of sediment is deterioration of concrete into a sediment form mainly at a boundary between asphalt and a concrete slab.

The structure evaluation system 100 includes a plurality of sensors 20-1 to **20-*n*, a signal processor 30, and a structure evaluation apparatus 40. The plurality of sensors 20-1 to 20-*n* and the signal processor 30 are communicatively connected using wires. The signal processor 30 and the structure evaluation apparatus 40 are communicatively connected using wires or wirelessly. In the following description, in a case in which the sensors 20-1 to 20-*n* do not need to be distinguished from each other, they will be described as a sensor 20**.

The sensor 20 has a piezoelectric element and detects an elastic wave 11 generated from the inside of the structure 50. The sensor 20 is installed at a position on the face of the structure 50 at which the elastic wave 11 can be detected. For example, the sensor 20 is installed on one of the road surface, a side surface, and a bottom surface. The sensor 20 converts a detected elastic wave 11 into an electrical signal. In the following description, a case in which the sensors 20 are installed on the bottom surface of the structure 50 will be described as an example.

As the sensor 20, for example, a piezoelectric element having sensitivity in the range of 10 kHz to 1 MHz is used. As types of the sensor 20, there are a resonance type having a resonance peak within a frequency range, a broadband type suppressing resonance, and the like, and the type of the sensor 20 may be any one thereof. As methods used by the sensor 20 for detecting an elastic wave 11, there are a voltage output type, a resistance changing type, a capacitance type, and the like, and any one of these detection methods may be used.

An acceleration sensor may be used instead of the sensor 20. In such a case, the acceleration sensor detects an elastic wave 11 generated inside the structure 50. By performing a process similar to that of the sensor 20, the acceleration sensor converts the detected elastic wave 11 into an electrical signal.

For example, an amplifier and an A/D converter, which are not illustrated, may be disposed between the sensor 20 and the signal processor 30.

The amplifier, for example, amplifies an electrical signal output from the sensor 20. The amplifier outputs an electrical signal after amplification to the A/D converter. The amplifier amplifies an electrical signal such that it can be processed by the A/D converter.

The A/D converter converts the amplified electrical signal into a digital signal through quantization. The A/D converter outputs the digital signal to the signal processor 30.

The signal processor 30 has the digital signal output from the A/D converter as its input. The signal processor 30 performs signal processing on the input digital signal. The signal processing performed by the signal processor 30, for example, is noise elimination, parameter extraction, and the like. The signal processor 30 generates transmission data including the digital signal after signal processing. The signal processor 30 outputs the generated transmission data to the structure evaluation apparatus 40.

The signal processor 30 is configured using an analog circuit or a digital circuit. The digital circuit, for example, is realized using a field programmable gate array (FPGA) or a microcomputer. The digital circuit may be realized using a dedicated large-scale integration (LSI). In addition, in the signal processor 30, a nonvolatile memory such as a flash memory or a detachable memory may be mounted.

Figure 4:
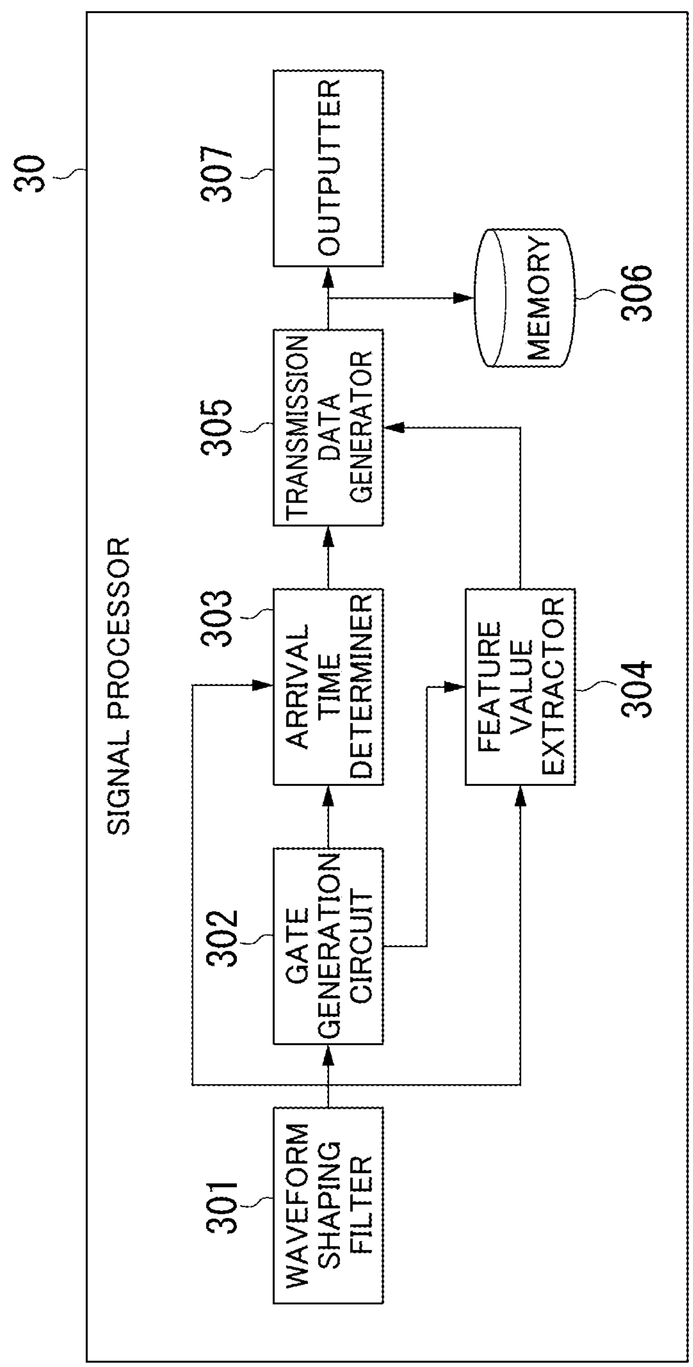
FIG. 4 is a schematic block diagram illustrating functions of a signal processor according to the first embodiment.

FIG. 4 is a schematic block diagram illustrating functions of the signal processor 30 according to the first embodiment. The signal processor 30 includes a waveform shaping filter 301, a gate generation circuit 302, an arrival time determiner 303, a feature value extractor 304, a transmission data generator 305, a memory 306, and an outputter 307.

The waveform shaping filter 301 eliminates noise components of a band other than a predetermined band from an input digital signal. The waveform shaping filter 301, for example, is a digital band pass filter (BPF). The waveform shaping filter 301 outputs a digital signal after elimination of a noise component (hereinafter referred to as a noise-eliminated signal) to the gate generation circuit 302, the arrival time determiner 303, and the feature value extractor 304.

The gate generation circuit 302 has the noise-eliminated signal output from the waveform shaping filter 301 as its input. The gate generation circuit 302 generates a gate signal on the basis of the input noise-eliminated signal. The gate signal is a signal that represents whether or not the waveform of the noise-eliminated signal is sustained.

The gate generation circuit 302, for example, is realized using an envelope detector and a comparator. The envelope detector detects an envelope of the noise-eliminated signal. The envelope, for example, is extracted by squaring a noise-eliminated signal and performing a predetermined process on the squared output value (for example, a process using a low pass filter or a Hilbert transformation). The comparator determines whether or not an envelope of the noise-eliminated signal is equal to or higher than a predetermined threshold.

In a case in which the envelope of the noise-eliminated signal is equal to or more than the predetermined threshold, the gate generation circuit 302 outputs a first gate signal indicating that the waveform of the noise-eliminated signal is continued to the arrival time determiner 303 and the feature value extractor 304. On the other hand, in a case in which the envelope of the noise-eliminated signal is less than the predetermined threshold, the gate generation circuit 302 outputs a second gate signal indicating that the waveform of the noise-eliminated signal is not continued to the arrival time determiner 303 and the feature value extractor 304.

The arrival time determiner 303 has a noise-eliminated signal output from the waveform shaping filter 301 and a gate signal output from the gate generation circuit 302 as its inputs. The arrival time determiner 303 determines an elastic wave arrival time using the noise-eliminated signal input during input of the first gate signal. The arrival time determiner 303 outputs the determined elastic wave arrival time to the transmission data generator 305 as time information. The arrival time determiner 303 does not perform a process during input of the second gate signal.

The feature value extractor 304 has a noise-eliminated signal output from the waveform shaping filter 301 and a gate signal output from the gate generation circuit 302 as its inputs. The feature value extractor 304 extracts a feature value of the noise-eliminated signal using the noise-eliminated signal input during input of the first gate signal. The feature value extractor 304 does not perform a process during input of the second gate signal. The feature value is information that represents a feature of the noise-eliminated signal.

The feature value, for example, is an amplitude [mV] of a waveform, a rise time [usec] of the waveform, a continuation time [usec] of a gate signal, a zero cross count number [times], an energy [arb.], a frequency [Hz], and a root mean square (RMS) value of the waveform, and the like. The feature value extractor 304 outputs parameters relating to the extracted feature quantities to the transmission data generator 305. When parameters relating to feature quantities are output, the feature value extractor 304 associates a sensor ID with a parameter relating to the feature quantities. The sensor ID represents identification information used for identifying the sensor 20 that is installed in an area that is an evaluation target of soundness of the structure 50 (hereinafter, referred to as an "evaluation area").

The amplitude of the waveform, for example, is a value of the maximum amplitude in the noise-eliminated signal. The rise time of the waveform, for example, is a time T1 until the noise-eliminated signal reaches a maximum value from start of the rise of the gate signal. The continuation time of the gate signal, for example, is a time until the amplitude becomes smaller than a value set in advance from the start of the rise of the gate signal. The zero cross count number, for example, is the number of times of the noise-eliminated signal crossing a reference line passing through a zero value.

The energy of a waveform, for example, is a value that is acquired by performing time integration of a square of the amplitude of the noise-eliminated signal at each time point. The definition of the energy is not limited to the example described above and, for example, may be an approximated energy using an envelope of the waveform. The frequency is a frequency of the noise-eliminated signal. The RMS value, for example, is a value obtained using a square root of squares of the amplitude of the noise-eliminated signal at each of time points.

The transmission data generator 305 has a sensor ID, time information, and parameters relating to feature quantities as its input. The transmission data generator 305 generates transmission data including the sensor ID, the time information, and the parameters relating to feature quantities that have been input.

The memory 306 stores the transmission data. The memory 306, for example, is a dual port random access memory (RAM).

The outputter 307 sequentially outputs transmission data stored in the memory 306 to the structure evaluation apparatus 40.

The description will be continued with reference back to FIG. 3.

The structure evaluation apparatus 40 includes a communicator 41, a controller 42, a storage 43, and a display 44.

The communicator 41 receives transmission data output from the signal processor 30.

The controller 42 controls the entire structure evaluation apparatus 40. The controller 42 is configured using a processor such as a central processing unit (CPU) and a memory. By executing a program, the controller 42 functions as an acquirer 421, an event extractor 422, a position locator 423, a distribution generator 424, a corrector 425, and an evaluator 426.

Some or all of functional members including the acquirer 421, the event extractor 422, the position locator 423, the distribution generator 424, the corrector 425, and the evaluator 426 may be realized by hardware such as an application specific integrated circuit (ASIC), a programmable logic device (PLD), or an FPGA or may be realized by software and hardware in cooperation. The program may be recorded on a computer-readable recording medium. The computer-readable recording medium, for example, is a non-transitory storage medium such as a portable medium including a flexible disk, a magneto-optical disk, a ROM, a CD-ROM, and the like, a storage device such as a hard disk built into a computer system, or the like. The program may be transmitted through a telecommunication line.

Some of the functions of the acquirer 421, the event extractor 422, the position locator 423, the distribution generator 424, the corrector 425, and the evaluator 426 do not need to be installed in the structure evaluation apparatus 40 in advance and may be realized by an additional application program being installed in the structure evaluation apparatus 40.

The acquirer 421 obtains various kinds of information. For example, the acquirer 421 acquires transmission data received by the communicator 41. The acquirer 421 stores the obtained transmission data in the storage 43. In the first embodiment, the acquirer 421 obtains information about vehicles 10 that have traveled over the structure 50 that is an evaluation target (hereinafter referred to as "vehicle information) corresponding to a predetermined period.

The vehicle information, for example, is vehicle type information of vehicles 10 that have traveled over the structure 50 in a predetermined period and traffic volume information of the vehicles 10 on the structure 50. The vehicle type information of the vehicle 10 includes at least information of tread widths of vehicles 10. The traffic volume information of the vehicle 10 is information representing how many vehicles 10 of a certain vehicle type have passed through the structure 50 in a predetermined period. The acquirer 421 may obtain the vehicle information in accordance with an input of a user or may obtain the vehicle information from a server storing traffic information.

The event extractor 422 extracts transmission data of one event from the transmission data stored in the storage 43. The event represents an elastic wave generation event that has occurred in the structure 50. In this embodiment, the elastic wave generation event is a passage of the vehicle 10 over a road surface. In a case in which one event has occurred, elastic waves 11 are detected by the plurality of sensors 20 at an approximately same time. In other words, transmission data relating to elastic waves 11 that have been detected at an approximately same time is stored in the storage 43. Thus, the event extractor 422 provides a predetermined time window and extracts all the transmission data of which an arrival time is present within the range of the time window as transmission data of one event. The event extractor 422 outputs the extracted transmission data of one event to the position locator 423.

The range Tw of the time window may be determined to be a range in which $Tw \geq dmax/v$ is satisfied using an elastic wave propagation speed v and a maximum sensor interval dmax in the structure 50 that is a target. In order to avoid erroneous detection, it is preferable to set Tw to as small a value as possible, and thus substantially $Tw = dmax/v$. The elastic wave propagation speed v may be obtained in advance.

The position locator 423 performs position locating of an elastic wave source on the basis of sensor position information and a sensor ID and time information included in each of a plurality of pieces of transmission data extracted by the event extractor 422.

Information about an installation position of the sensor 20 is included in the sensor position information in association with a sensor ID. The sensor position information, for example, includes information about an installation position of the sensor 20 such as a latitude and longitude or a horizontal-direction distance and a vertical-direction distance from a position that is a reference of the structure 50. The position locator 423 stores the sensor position information in advance. The sensor position information may be stored in the position locator 423 at a certain timing before the position locator 423 performs position locating of elastic wave sources.

The sensor position information may be stored in the storage 43. In such a case, the position locator 423 obtains sensor position information from the storage 43 at a timing at which position locating is performed. For the locating of the position of elastic wave sources, a Kalman filter, a least squares method, or the like may be used. The position locator 423 outputs position information of elastic wave sources obtained during a measurement period to the distribution generator 424.

The distribution generator 424 has position information of a plurality of elastic wave sources output from the position locator 423 as its input. The distribution generator 424 generates an elastic wave source distribution using the input position information of the plurality of elastic wave sources. The elastic wave source distribution represents a distribution in which positions of elastic wave sources are represented. More specifically, the elastic wave source distribution is a distribution in which points representing positions of elastic wave sources are illustrated in virtual data representing the structure 50 that is an evaluation target with the horizontal axis set as a distance in the passage direction and the vertical axis set as a distance in the width direction. The distribution generator 424 generates an elastic wave source density distribution using the elastic wave source distribution. For example, the distribution generator 424 generates an elastic wave source density distribution by illustrating positions of elastic wave sources using a contour diagram as illustrated in FIG. 2.

The corrector 425 corrects information based on position locating performed by the position locator 423 using a correction value set in correspondence with an impact. In the first embodiment, a correction value set in correspondence with an impact is a correction value obtained using the vehicle information obtained by the acquirer 421. The correction values have extreme values at positions through which the running parts of the vehicle 10 pass. The information based on position locating is information that can be obtained before the position locating (for example, the amplitude of an elastic wave) or a result of the position locating. For example, the information based on the position locating is an elastic wave source density distribution. In the following description, a case in which the information based on the position locating is the elastic wave source density distribution will be described as an example.

The evaluator 426 evaluates a deterioration state of the structure 50 on the basis of the corrected information. More specifically, the evaluator 426 evaluates the deterioration state of the structure 50 using the corrected elastic wave source density distribution. For example, the evaluator 426 evaluates an area of which the density of elastic wave sources is equal to or higher than a threshold as a sound area and evaluates an area of which the density of elastic wave sources is lower than the threshold as a damaged area.

The storage 43 stores the transmission data and the vehicle information obtained by the acquirer 421. The storage 43 is configured using a storage device such as a magnetic hard disk device, a semiconductor storage device, or the like.

The display 44 displays an evaluation result in accordance with control of the evaluator 426. The display 44 is an image display device such as a liquid crystal display, an organic electroluminescence (EL) display, or the like. The display 44 may be an interface used for connecting an image display device to the structure evaluation apparatus 40. In such a case, the display 44 generates a video signal for displaying an evaluation result and outputs a video signal to an image display device connected thereto.

Figure 5:
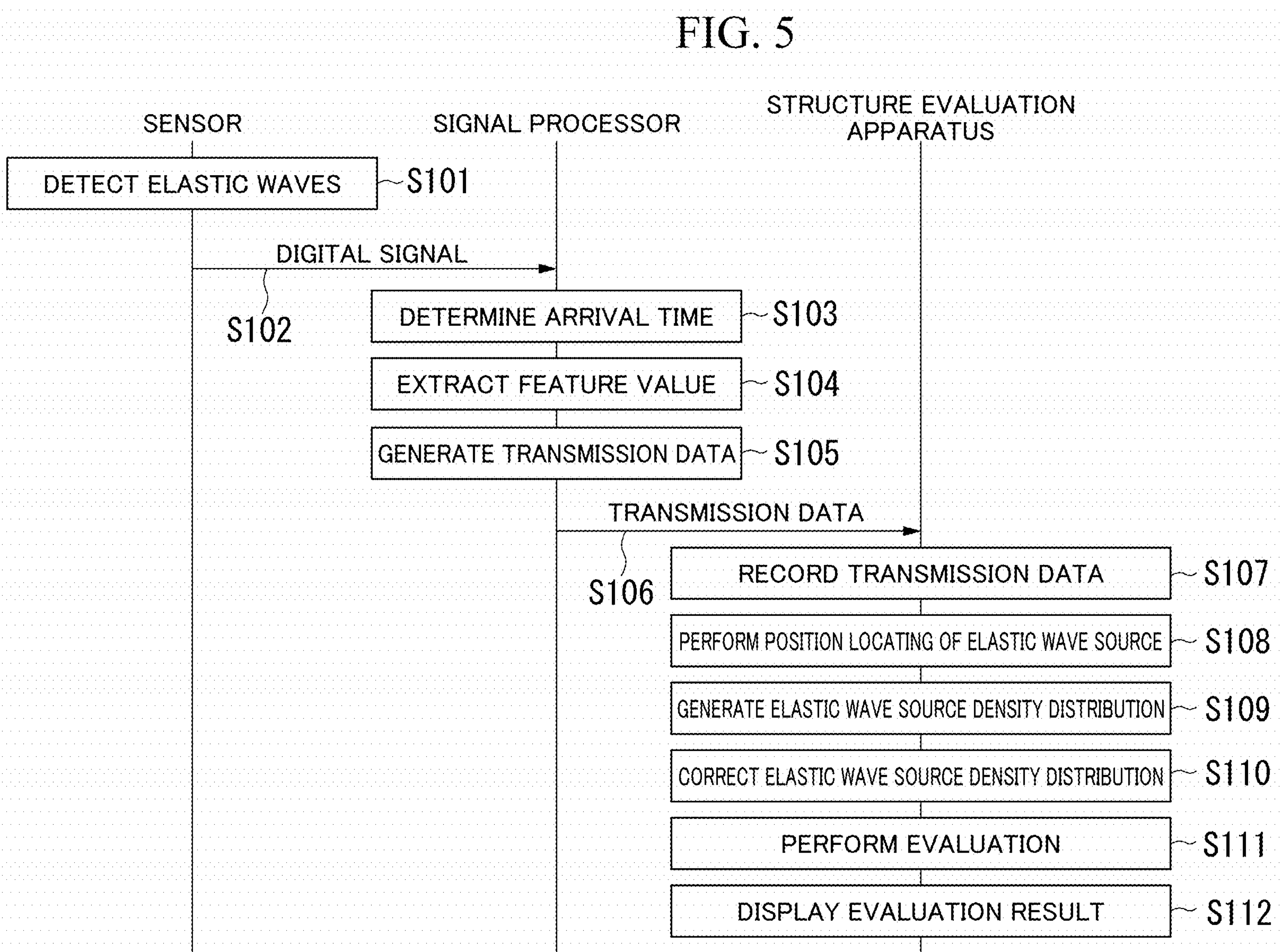
FIG. 5 is a sequence diagram illustrating the flow of a deterioration state evaluation process performed by the structure evaluation system according to the first embodiment.

FIG. 5 is a sequence diagram illustrating the flow of a deterioration state evaluation process performed by the structure evaluation system 100 according to the first embodiment. The process illustrated in FIG. 5 is performed in accordance with the vehicle 10 traveling over the structure 50 that is an evaluation target.

When the vehicle 10 travels over the structure 50 that is an evaluation target, the running parts of the vehicle 10 are in contact with the road surface. In accordance with this, elastic waves 11 are generated inside the structure 50. Each of the plurality of sensors 20 detects an elastic wave 11 generated inside the structure 50 (Step S101). Each of the plurality of sensors 20 converts the detected elastic wave 11 into an electrical signal and outputs the electrical signal to the signal processor 30 (Step S102). The electrical signal output from each of the plurality of sensors 20 is amplified by an amplifier which is not illustrated. The electrical signal after amplification is converted into a digital signal by an A/D converter.

The signal processor 30 has a digital signal output from the A/D converter as its input. The arrival time determiner 303 of the signal processor 30 determines an arrival time of each elastic wave 11 using the input digital signal (Step S103). More specifically, the arrival time determiner 303 determines an elastic wave arrival time using a noise-eliminated signal that is a digital signal input during input of the first gate signal. The arrival time determiner 303 outputs the determined elastic wave arrival time to the transmission data generator 305 as time information. The arrival time determiner 303 performs this process for all the input digital signals.

The feature value extractor 304 of the signal processor 30 extracts a feature value of a noise-eliminated signal using the noise-eliminated signal that is a digital signal input during input of the first gate signal (Step S104). The feature value extractor 304 outputs parameters relating to the extracted feature value to the transmission data generator 305. The transmission data generator 305 generates transmission data including a sensor ID, the time information, and the parameters relating to the feature value (Step S105). The outputter 307 sequentially outputs the transmission data to the structure evaluation apparatus 40 (Step S106).

The communicator 41 of the structure evaluation apparatus 40 receives the transmission data output from the signal processor 30. The acquirer 421 obtains the transmission data received by the communicator 41. The acquirer 421 records the acquired transmission data in the storage 43 (Step S107). The event extractor 422 extract transmission data of one event from the transmission data stored in the storage 43.

The event extractor 422 outputs the extracted transmission data of one event to the position locator 423 and the distribution generator 424.

The position locator 423 locates the position of the elastic wave source on the basis of the sensor ID and the time information included in the transmission data output from the event extractor 422 and the sensor position information stored in advance (Step S108). More specifically, first, the position locator 423 calculates differences in arrival times of elastic waves 11 at the plurality of sensors 20. Next, the position locator 423 locates the position of the elastic wave source using the sensor position information and information of the differences in the arrival times.

The position locator 423 performs the process of Step S108 whenever transmission data of one event is output from the event extractor 422 during the measurement period. In accordance with this, the position locator 423 locates positions of a plurality of elastic wave sources. The position locator 423 outputs position information of the plurality of elastic wave sources to the distribution generator 424.

The distribution generator 424 generates an elastic wave source distribution using the position information of the plurality of elastic wave sources output from the position locator 423. More specifically, by plotting positions of the elastic wave sources represented in the acquired position information of the plurality of elastic wave sources on virtual data, the distribution generator 424 generates an elastic wave source distribution. By representing the generated elastic wave source distribution using a contour diagram, the distribution generator 424 generates the elastic wave source density distribution (Step S109). The distribution generator 424 outputs the generated elastic wave source density distribution to the corrector 425.

The corrector 425 has the elastic wave source density distribution output from the distribution generator 424 and the vehicle information stored in the storage 43 as its input. The corrector 425 corrects the elastic wave source density distribution using correction values acquired using the input vehicle information (Step S110).

More specifically, first, the corrector 425 calculates correction values f(x, y) on the basis of the following Equation (1) using the vehicle information.

$$f(x, y) = 1 - k\left(e^{-2\left(\frac{y-a}{w}\right)^2}\right) \quad (1)$$

In Equation (1), y represents a distance in the width direction of the road, k represents a coefficient, a represents a running part position, and w represents a degree of deviation of a passage position. The correction values acquired using Equation (1) have a distribution having peaks at the passage positions of the running parts in the y direction and having a constant value in the passage direction of the x direction. For positions of the running parts used at the time of correction, the tread width of the vehicle 10 included in the vehicle information can be referred to.

In the case of a large vehicle that is assumed to generate many elastic waves 11, the tread width is about 1900 mm for a 10 t truck. For this reason, the running part position a may be set to a position of ±950 mm from the center of the lane. In a case of a general vehicle, the tread width is about 1500 mm. For this reason, the running part position a can be set to ±750 mm from the center of the lane.

The running part position can be determined in accordance with a traffic situation of the structure 50 that is an evaluation target. In a case in which the structure 50 that is an evaluation target is a road over which large vehicles do not pass, as the tread width, for example, about 1500 mm for a general vehicle may be used, and ±750 mm from the center of the lane may be set as the running part position. Information of the traffic situation of the structure 50 may be input to the structure evaluation apparatus 40 from the outside or may be included in the vehicle information.

The corrector 425 may determine the running part position a on the basis of statistical values of information of vehicle types included in the vehicle information. For example, the corrector 425 may set a tread width of a vehicle type of which a passage number is the largest as the running part position a from statistical results of information of vehicle types included in the vehicle information. For example, on the basis of statistical results of information of vehicle types included in the vehicle information, the corrector 425 may set the tread width of a vehicle type of which the tread width is a maximum as the running part position a or may set an average tread width as the running part position a.

A deviation of the passage position may be set in accordance with the status of the structure 50 that is an evaluation target. For example, for an expressway or a road having a large road width, a deviation of passage positions of vehicles 10 becomes large. On the other hand, for a narrow road on which only one vehicle 10 can pass, all the vehicles pass through an approximately-same position, and thus the deviation becomes small. Thus, by referring to traffic volume information, a road width, a frequency of lane change, and the like, the corrector 425 appropriately sets parameters relating to a degree of deviation of passage positions.

Figure 6:
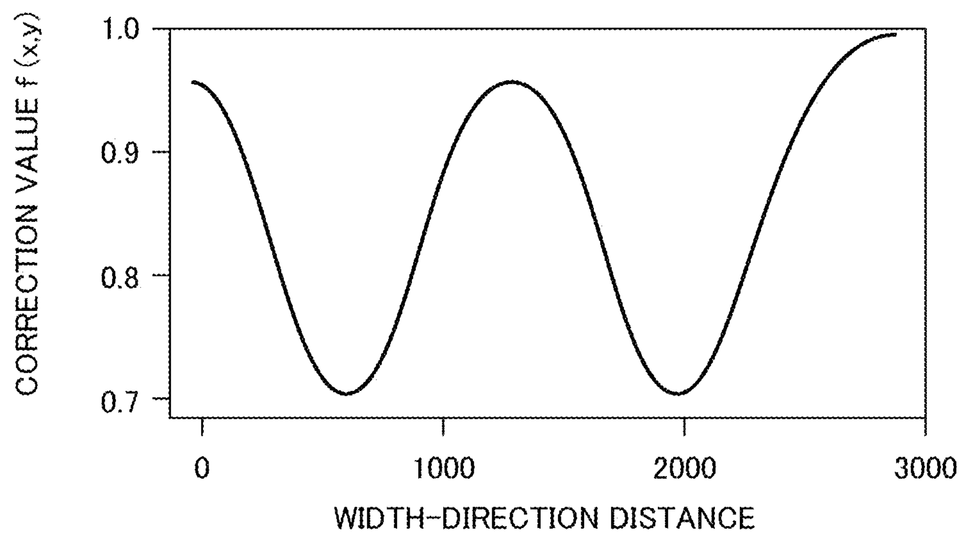
FIG. 6 is a diagram illustrating an example of correction values according to the first embodiment.

FIG. 6 illustrates an example of correction values calculated on the basis of Equation (1) described above. In FIG. 6, the horizontal axis represents a distance in the width direction, and the vertical axis represents a correction value f(x, y). As illustrated in FIG. 6, the correction values f(x, y) are represented in a distribution having values for decreasing values (for example, densities) of positions on the elastic wave source density distribution at least corresponding to the passage positions of the running part of the vehicle 10. In other words, the correction value f(x, y) is represented in a distribution in which the values of positions on an elastic wave source density distribution corresponding to the passage positions of the running parts of the vehicle 10 are decreased the most, and the value is decreased less as the position is away from the passage positions.

FIG. 6 illustrates correction values f(x, y) in a case in which there are two passage positions of running parts of the vehicle 10 as an example. For this reason, the correction values f(x, y) illustrated in FIG. 6 have two values that decrease values of positions on an elastic wave source density distribution corresponding to the passage positions of the running parts of the vehicle 10 the most. There may be one passage position of the running parts of the vehicle 10 depending on an evaluation area. For this reason, the correction values f(x, y) may have one or more values that decrease the values of positions on an elastic wave source density distribution corresponding to the passage positions of the running parts of the vehicle 10 the most.

The corrector 425 multiplies the elastic wave source density distribution by the calculated correction values f(x, y), thereby correcting the elastic wave source density distribution. More specifically, the corrector 425 multiplies the elastic wave source density distribution in the width direction by correction values f(x, y) corresponding to width-direction distances of the calculated correction values f(x, y).

For example, the corrector 425 multiples a value of the density of the position of a width-direction distance “500” of the elastic wave source density distribution by a correction value f(x, y) corresponding to the position of the width-direction distance “500” of the calculated correction values f(x, y). Similarly, the corrector 425 also multiplies the elastic wave source density distribution in the passage direction by correction values f(x, y) corresponding to width-direction distances. For example, the corrector 425 multiplies all the values of densities of positions of passage-direction distances “0 to 3000” corresponding to the position of a width-direction distance “500” of the elastic wave source density distribution by the correction value f(x, y) corresponding to the position of the width-direction distance “500” of the calculated correction values f(x, y).

Figure 7:
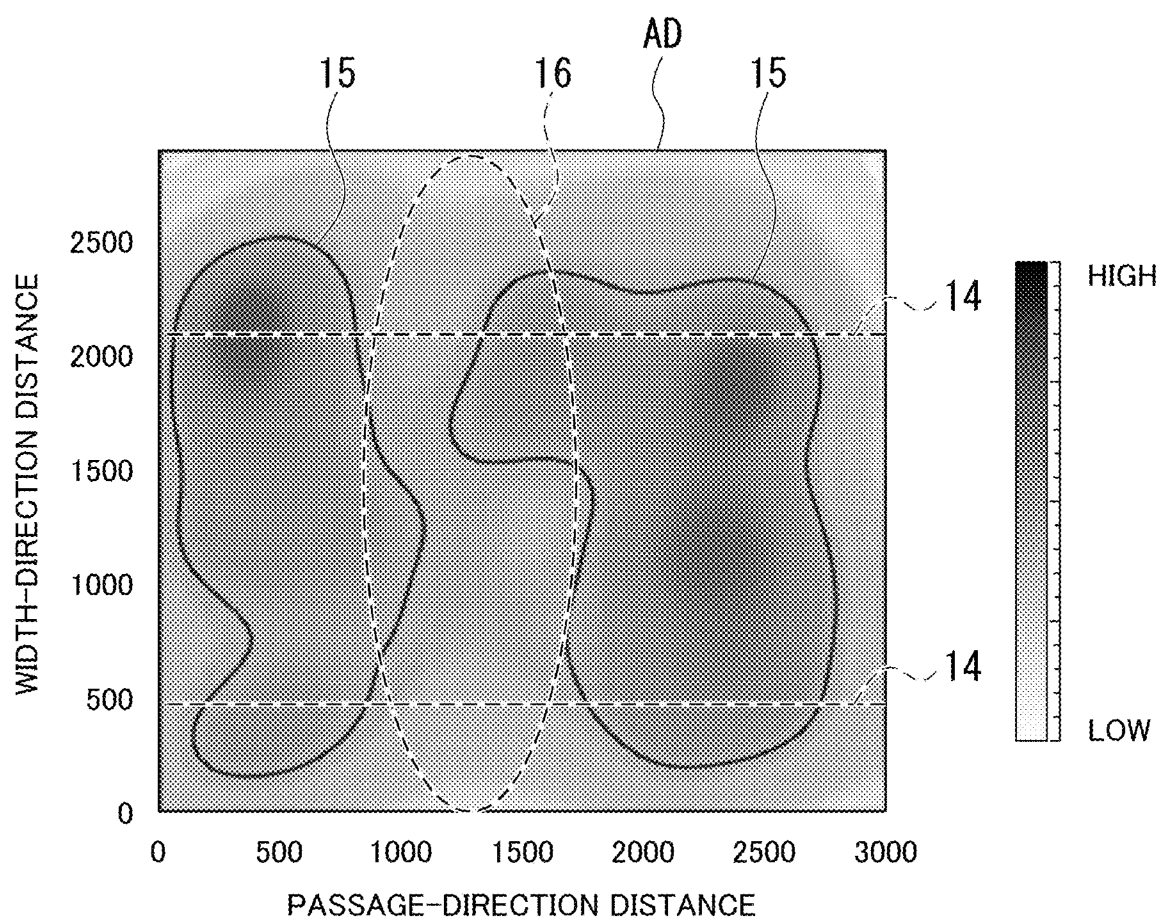
FIG. 7 is a diagram illustrating an example of an elastic wave source density distribution after correction according to the first embodiment.

The corrector 425 corrects the elastic wave source density distribution by performing the process described above, thereby generating an elastic wave source density distribution AD after correction illustrated in FIG. 7. The corrector 425 outputs the elastic wave source density distribution AD after correction to the evaluator 426.

FIG. 7 is a diagram illustrating an example of the elastic wave source density distribution AD after correction. In FIG. 7, the horizontal axis represents a distance in the passage direction of the vehicle, and the vertical axis represents a distance in the width direction. In the elastic wave source density distribution AD after correction illustrated in FIG. 7, it can be understood that the influence according to passage of the running parts of the vehicle 10 is reduced more than in the elastic wave source density distribution D illustrated in FIG. 2. The influence according to passage of the running parts of the vehicle 10 is an increase in the density of the elastic wave source of a position through which the running parts of the vehicle 10 pass. The evaluator 426 evaluates a deterioration state of the structure 50 using the elastic wave source density distribution AD after correction output from the corrector 425 (Step S111).

The evaluator 426 evaluates an area of which a density is lower than the threshold 15 set in the elastic wave source density distribution AD after correction as a damaged area using the conventional evaluation technique. In this case, an area 16 illustrated in FIG. 7 is evaluated as a damaged area. The evaluator 426 outputs a result of the evaluation to the display 44. The display 44 displays the result of the evaluation output from the evaluator 426 (Step S112). For example, the display 44 may display the elastic wave source density distribution after correction as a result of the evaluation or may display an area regarded as a damaged area by changing a display form from that of other areas.

The structure evaluation system 100 configured as above performs correction such that a deviation of information based on position locating performed by the position locator is decreased using a correction value f(x, y) set in correspondence with an impact. More specifically, the structure evaluation apparatus 40 calculates a correction value f(x, y) for a future impact from the vehicle information of the vehicle 10 that has traveled over the structure 50 that is an evaluation target. Then, the structure evaluation apparatus 40 corrects the influence of impacts due to passage of the running parts of the vehicle 10 in the elastic wave source density distribution that is information based on the position locating using the calculated correction value f(x, y). In accordance with this, erroneous diagnoses can be decreased. For this reason, even in a case in which an impact applied to the road surface is not uniform, the accuracy of evaluation of the structure 50 can be improved.

The corrector 425 corrects the elastic wave source density distribution using correction value f(x, y) having one or more extreme value parts used for correcting at least information of positions to which an impact is applied. The information of the position at which an impact is applied, for example, is information of a position that is influenced in accordance with passage of the running parts of the vehicle 10. As described above, the densities of the positions through which the running parts of the vehicle 10 pass tend to be higher than those of positions through which the running part of the vehicle 10 does not pass. Thus, in order to reduce the influence caused in by passage of the running parts of the vehicle 10, the corrector 425 performs correction using correction value f(x, y) having one or more extreme value parts. In accordance with this, the influence caused by the passage of the running parts of the vehicle 10 can be reduced. As a result, even in a case in which an impact applied to the road surface is not uniform, the accuracy of evaluation of the structure 50 can be improved.

The corrector 425 corrects the elastic wave source density distribution in the passage direction of the vehicle 10 using the correction value f(x, y) set for each distance in the width direction of the road. One vehicle 10 travels over the road with the same tread width. Thus, when seen in the passage direction of the vehicle 10, as illustrated in FIG. 2, an impact (a dotted line 14) is applied to the road surface in a linear shape. Thus, the corrector 425 calculates a correction value f(x, y) for each width-direction distance and uses the same correction value f(x, y) in the passage direction seen from a position of one width-direction distance. For example, the corrector 425 uses the same correction value f(x, y) for values of the positions of passage-direction distances “0 to 3000” seen from a position “500” of the width-direction distance. In accordance with this, not all the correction value of positions having the same width-direction distance and having different passage-direction distances need to be calculated. For this reason, correction can be performed in a simple manner.

The corrector 425 calculates a correction value on the basis of positions of generation of an impact generated in accordance with contacts between the running parts of the vehicle 10 and the road surface. In accordance with this, the corrector 425 can calculate correction value with positions for further reducing the influence caused by passage of the running parts of the vehicle 10 taken into account. For example, the corrector 425 can calculate correction value that reduce values of positions having a large influence caused by passage of the running parts of the vehicle 10 the most. In accordance with this, erroneous diagnoses can be reduced. For this reason, even in a case in which an impact applied to the road surface is not uniform, the accuracy of evaluation of the structure 50 can be improved.

Hereinafter, modified examples of the structure evaluation system 100 will be described.

Figure 8:
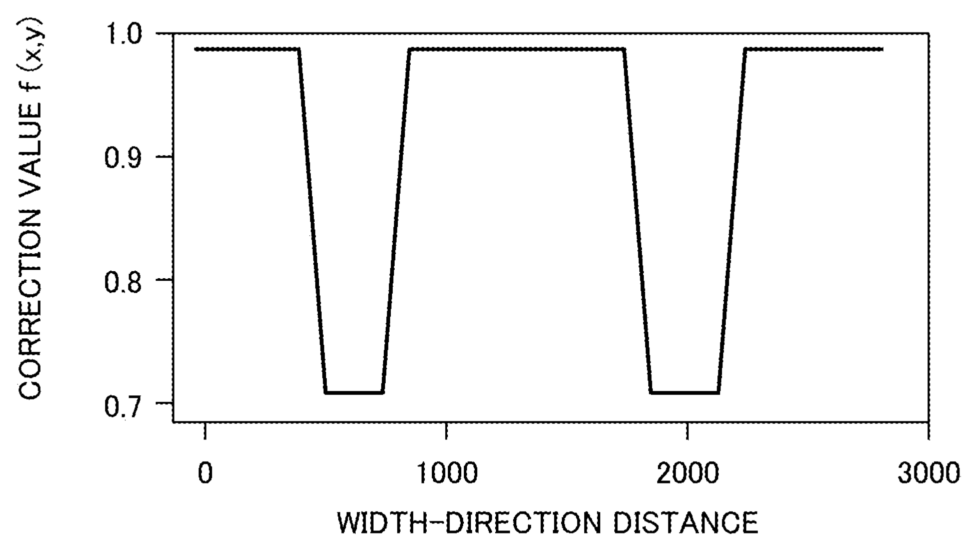
FIG. 8 is a diagram illustrating another example of correction values according to the first embodiment.

The correction value is not limited to the form obtained in Equation (1). For example, the correction value, as illustrated in FIG. 8, may have a distribution represented by a function of a rectangle or a shape close to a rectangle.

The corrector 425 may calculate correction value f(x, y) that are closer to the actual values by combining weighted distributions for a tread width for each vehicle type in accordance with a ratio of vehicle types of the vehicle 10 that is obtained from the vehicle information.

In a case in which all the vehicles 10 travel an approximately same position in accordance with a situation in which the road width is very small, there may be also cases in which an impact causing elastic waves 11 to be generated is hardly applied in an area other than a rut. Thus, the evaluator 426 may be configured to evaluate deterioration states of areas for which a frequency of applications of an impact is assumed to be equal to or higher than a threshold in the evaluation target area.

In the embodiment described above, although a configuration in which the corrector 425 calculates a correction value f(x, y) using the tread width of the vehicle 10 included in the vehicle information and the traffic volume information has been illustrated, the corrector 425 may calculate a correction value f(x, y) on the basis of the tread width of the vehicle 10. In a case in which such a configuration is employed, for example, the corrector 425 calculates a correction value f(x, y) with the degree of deviation w of the passage position in Equation (1) described above set to 1. The running part position a may be obtained similar to the embodiment described above.

In accordance with this, even when the traffic volume information cannot be obtained, the corrector 425 can calculate a correction value f(x, y) using the information of the tread width. For this reason, correction can be performed using a small amount of information.

Second Embodiment

In the first embodiment, a configuration in which the corrector 425 calculates a correction value f(x, y) using the vehicle information has been illustrated. In the second embodiment, a configuration in which a correction value f(x, y) is obtained by estimating a position through which a vehicle 10 has passed on the basis of an electrical signal obtained from a sensor 20 will be described.

Figure 9:
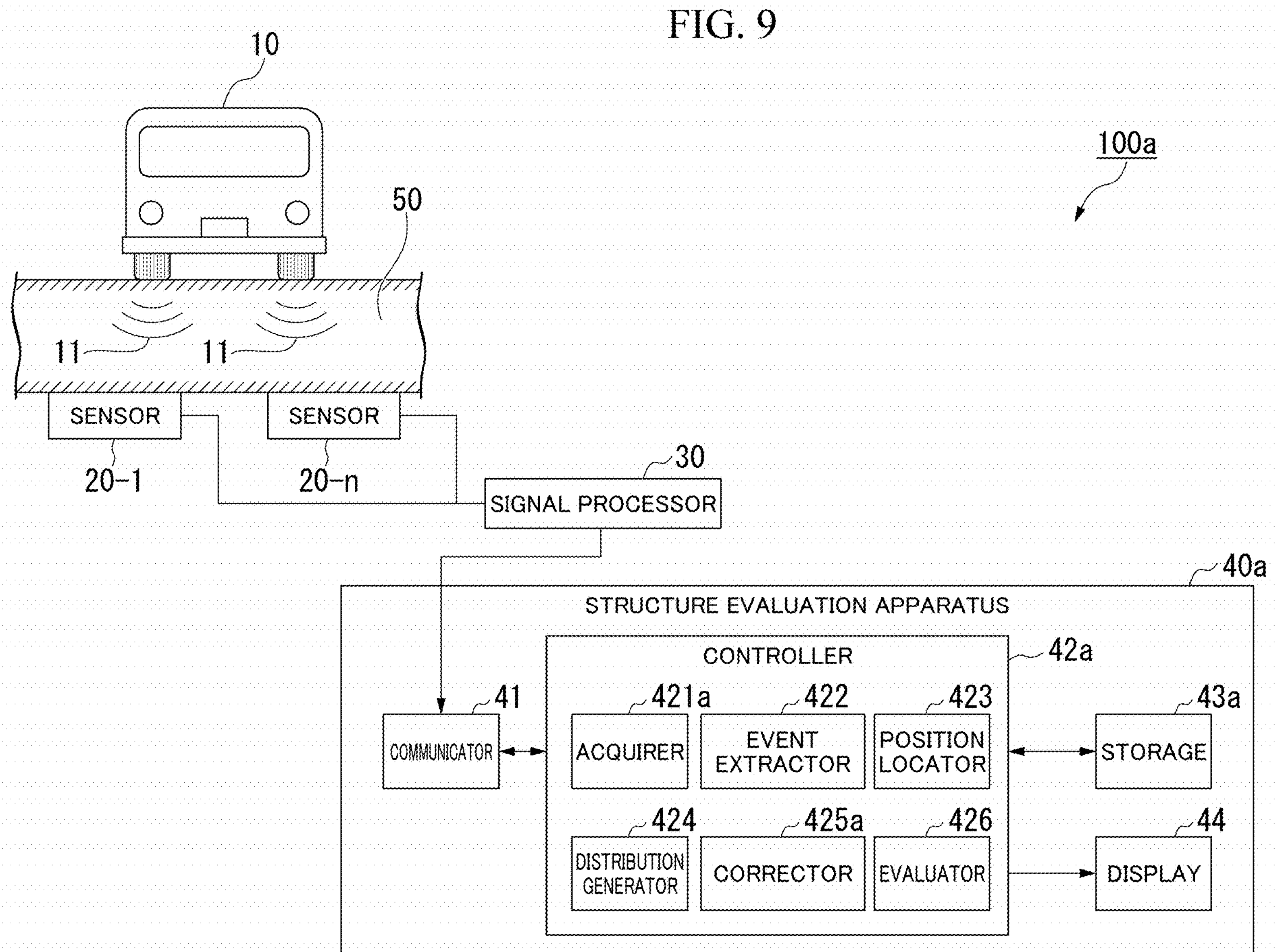
FIG. 9 is a diagram illustrating the configuration of a structure evaluation system according to a second embodiment.

FIG. 9 is a diagram illustrating the configuration of a structure evaluation system 100*a* according to the second embodiment. The structure evaluation system 100*a* according to the second embodiment is similar to the first embodiment except for a structure evaluation apparatus 40*a* being included instead of the structure evaluation apparatus 40. Hereinafter, the configuration of the structure evaluation apparatus 40*a* relating to differences will be described.

The structure evaluation apparatus 40*a* includes a communicator 41, a controller 42*a*, a storage 43*a*, and a display 44. The controller 42*a* controls the entire structure evaluation apparatus 40*a*. The controller 42*a* is configured using a processor such as a CPU and a memory. By executing a program, the controller 42*a* functions as an acquirer 421*a*, an event extractor 422, a position locator 423, a distribution generator 424, a corrector 425*a*, and an evaluator 426.

Some or all of functional members including the acquirer 421*a*, the event extractor 422, the position locator 423, the distribution generator 424, the corrector 425*a*, and the evaluator 426 may be realized by hardware such as an ASIC, a PLD, or an FPGA or may be realized by software and hardware in cooperation. The program may be recorded on a computer-readable recording medium. The computer-readable recording medium, for example, is a non-transitory storage medium such as a portable medium including a flexible disk, a magneto-optical disk, a ROM, a CD-ROM, and the like, a storage device such as a hard disk built into a computer system, or the like. The program may be transmitted through a telecommunication line.

Some of the functions of the acquirer 421*a*, the event extractor 422, the position locator 423, the distribution generator 424, the corrector 425*a*, and the evaluator 426 do not need to be installed in the structure evaluation apparatus 40*a* in advance and may be realized by an additional application program being installed in the structure evaluation apparatus 40*a*.

The controller 42*a* includes the acquirer 421*a* and the corrector 425*a* instead of the acquirer 421 and the corrector 425, which is different from the configuration of the controller 42. Hereinafter, different points will be described.

The acquirer 421*a* obtains various kinds of information. For example, the acquirer 421*a* acquires transmission data received by the communicator 41. The acquirer 421*a* stores the obtained transmission data in the storage 43. In the second embodiment, the acquirer 421*a* obtains information representing positions of sound areas (hereinafter, referred to as "sound position information") of a structure 50 that is an evaluation target. The acquirer 421*a* obtains the sound position information in accordance with user's input.

The corrector 425*a* corrects information based on position locating performed by the position locator 423 using a correction value f(x, y) set in correspondence with an impact. In the second embodiment, a correction value set in correspondence with an impact is a correction value obtained on the basis of an electrical signal obtained from the sensor 20. For example, in the second embodiment, a correction value set in accordance with an impact is a correction value obtained by calculating a tread width on the basis of an electrical signal obtained from the sensor 20.

The storage 43*a* stores the transmission data and the sound position information obtained by the acquirer 421*a*. The storage 43*a* is configured using a storage device such as a magnetic hard disk device, a semiconductor storage device, or the like.

The flow of a deterioration state evaluation process using the structure evaluation system 100*a* according to the second embodiment will be described. In the structure evaluation system 100*a* according to the second embodiment, the process of Step S110 illustrated in FIG. 5 is different from that of the first embodiment. Hereinafter, the point will be described.

The corrector 425*a* has an elastic wave source density distribution output from the distribution generator 424 and sound position information stored in the storage 43*a* as its inputs. The corrector 425*a* corrects the elastic wave source density distribution on the basis of the elastic wave source density distribution and the sound position information that have been input (Step S110). More specifically, first, the corrector 425*a* estimates passage positions of running parts of the vehicle 10 using the elastic wave source density distribution.

As described above, in a case in which the vehicle 10 passes over the road surface, the density of the elastic wave source density distribution in the passage direction tends to be continuously raised. More specifically, the density of a position on an elastic wave source density distribution corresponding to passage positions of the running parts of the vehicle 10 tends to be continuously raised in the passage direction. The reason for this is that impacts are consecutively applied in the passage direction of the vehicle 10 in accordance with the vehicle 10 traveling on the road surface. Thus, the corrector 425*a* estimates the passage positions of the running parts of the vehicle 10 on the basis of a first condition and a second condition.

The first condition is that an area of which a density in the passage direction of the elastic wave source density distribution is equal to or higher than a first threshold is continuous for a first distance or more. The second condition is that two or more areas satisfying the first condition are present in the width direction. In a case in which the second condition is satisfied, the corrector 425*a* estimates each area satisfying the first condition as a passage position of the running part of the vehicle 10.

Next, the corrector 425*a* calculates a correction value f(x, y) decreasing the value of the position on an elastic wave source density distribution corresponding to the estimated passage position of the running part of the vehicle 10 by a threshold or more. For example, the corrector 425*a* calculates a correction value f(x, y) decreasing the value of the position on the elastic wave source density distribution corresponding to the estimated passage position of the running part of the vehicle 10 the most. When the correction value f(x, y) is calculated, the corrector 425*a* uses the sound position information. For example, the corrector 425*a* calculates a correction value f(x, y) using a value of the density (hereinafter, referred to as a reference value) of the area represented in the sound position information as a reference. The corrector 425*a* determines a lowest value of the correction value such that the value of the position on the elastic wave source density distribution corresponding to the estimated passage position of the running part of the vehicle 10 is adjusted to the reference value. The corrector 425*a* corrects the elastic wave source density distribution by multiplying the elastic wave source density distribution by the calculated correction value f(x, y).

In the structure evaluation system 100*a* configured as above, a correction value f(x, y) set in correspondence with an impact is acquired from the elastic wave source density distribution. More specifically, the structure evaluation apparatus 40*a* calculates a correction value f(x, y) for a past impact from the elastic wave source density distribution obtained in accordance with the vehicle 10 traveling over the structure 50 that is an evaluation target. Then, the structure evaluation apparatus 40*a* corrects the influence of an impact due to passage of the running part of the vehicle 10 in the elastic wave source density distribution that is information based on position locating using the calculated correction value f(x, y). In accordance with this, erroneous diagnoses can be decreased. For this reason, even in a case in which an impact applied to the road surface is not uniform, the accuracy of evaluation of the structure 50 can be improved.

Hereinafter, a modified example of the structure evaluation system 100*a* will be described.

There may be one passage position of the running parts of the vehicle 10 depending on an evaluation area. Thus, the corrector 425*a* may estimate the passage position of the running part of the vehicle 10 as below. In a case in which the first condition is satisfied, and the second condition is not satisfied, the corrector 425*a* estimates one area satisfying the first condition as the passage position of the running part of the vehicle 10. In this case, the corrector 425*a* calculates a correction value f(x, y) decreasing the value of the position on the elastic wave source density distribution corresponding to the estimated passage position of the running part of the vehicle 10 the most.

By configuring as such, even in a case in which only one passage position of the vehicle 10 is present inside the evaluation area, the effect of the impact due to passage of the running part of the vehicle 10 can be corrected. As a result, the accuracy of evaluation of the structure 50 can be improved.

In the embodiment described above, a configuration in which the corrector 425*a* obtains a correction value f(x, y) by estimating the passage position of the vehicle 10 from the elastic wave source density distribution has been illustrated. In contrast to this, the corrector 425*a* may be configured to correct the elastic wave source density distribution using the correction value f(x, y) generated by a user. In the case of configuring as such, in the process of Step S109, the distribution generator 424 outputs the generated elastic wave source density distribution to the display 44. The display 44 displays the elastic wave source density distribution.

A user perceives a position through which the running part of the vehicle 10 has passed by referring to the elastic wave source density distribution displayed in the display 44. Then, the user generates a correction value f(x, y) that can inhibit an influence caused in accordance with the passage of the running part of the vehicle 10 and inputs the generated correction value to the structure evaluation apparatus 40*a*. The correction value f(x, y) that can inhibit the influence is a value that can decrease a value corresponding to the density of the elastic wave source that has been raised in accordance with passage of the running part of the vehicle 10. For example, it is preferable that the correction value f(x, y) that can inhibit the influence be a value that can offset the influence caused in accordance with passage of the running part of the vehicle 10. The corrector 425*a* corrects the elastic wave source density distribution using the input correction value f(x, y).

By configuring as such, the position through which the running part of the vehicle 10 has passed is perceived by visual recognition of the user. In accordance with this, a position through which the running part of the vehicle 10 has passed can be roughly estimated. Then, the user generates a correction value f(x, y) that can inhibit the influence caused in accordance with passage of the running part of the vehicle 10 and inputs the generated correction value to the structure evaluation apparatus 40*a*. In accordance with this, the structure evaluation apparatus 40*a* does not need to calculate the correction value f(x, y). For this reason, the processing load can be reduced, and, even in a case in which an impact applied to the road surface is not uniform, the accuracy of evaluation of the structure 50 can be improved.

In a case in which all the vehicles 10 travel an approximately same position in accordance with a situation in which the road width is very small, there may be also cases in which an impact causing elastic waves 11 to be generated is hardly applied in an area other than a rut. Thus, the evaluator 426*a* may be configured to evaluate deterioration states of areas for which a frequency of applications of an impact is assumed to be equal to or higher than a threshold in the evaluation target area.

By configuring as such, the processing load can be reduced, and an erroneous diagnosis can be inhibited.

Third Embodiment

In the first embodiment and the second embodiment, a configuration in which the elastic wave source density distribution is corrected using the correction value f(x, y) has been illustrated. In a case in which all the vehicles 10 travel an approximately same position in accordance with a situation in which the road width is very small, there may be a case in which an impact causing generation of an elastic wave 11 is hardly applied in an area other than a rut. In this case, even when correction is performed for an area of which a frequency of application of an impact is lower than a threshold, a more remarkable effect may not be able to be acquired. Thus, in a third embodiment, a configuration in which correction of the elastic wave source density distribution is not performed, the deterioration state of an area of which a frequency of application of an impact is assumed to be equal to or higher than the threshold in the evaluation target area is evaluated, and the deterioration state of an area of which a frequency of application of an impact is assumed to be lower than the threshold is not evaluated will be described.

Figure 10:
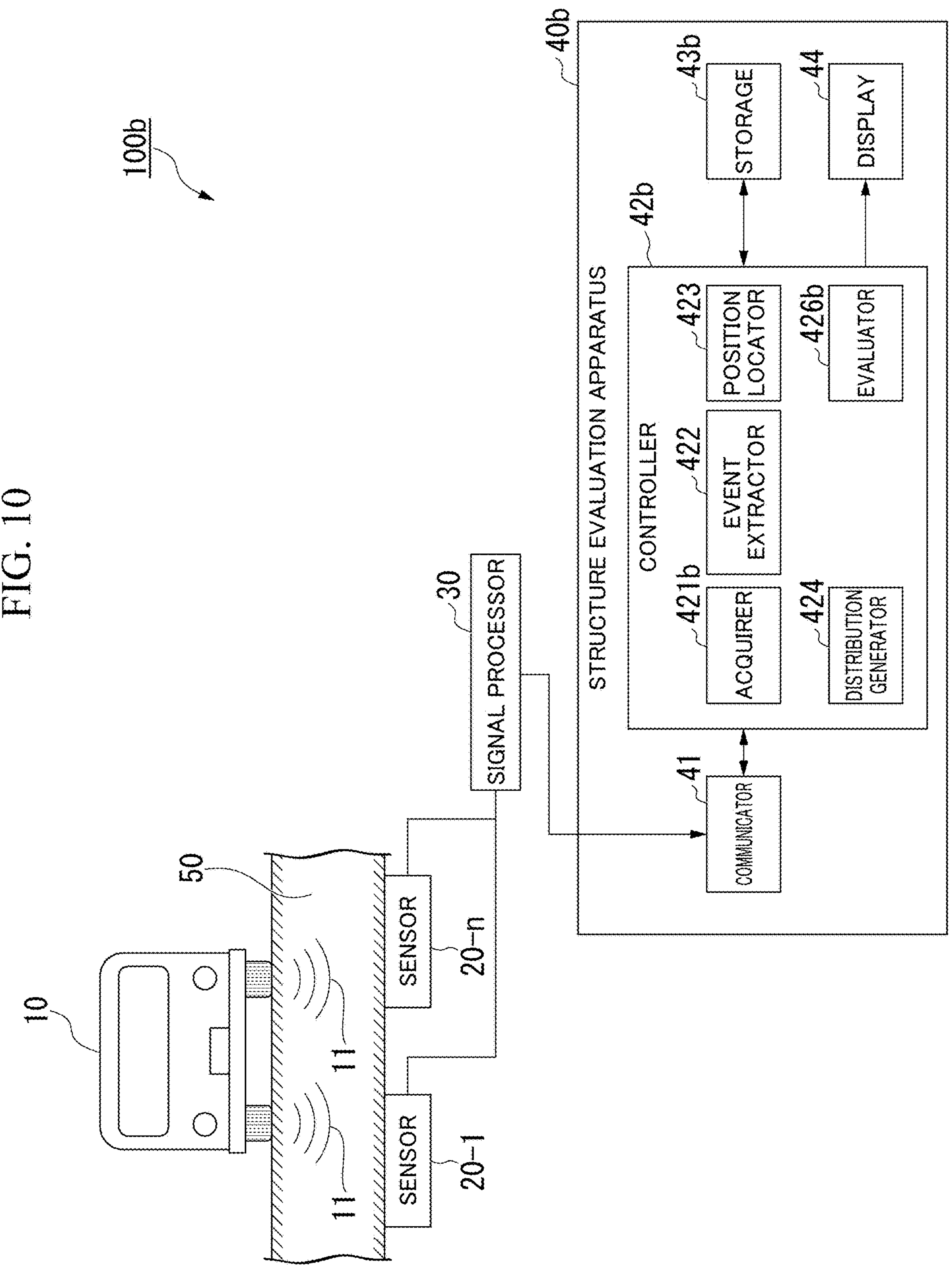
FIG. 10 is a diagram illustrating the configuration of a structure evaluation system according to a third embodiment.

FIG. 10 is a diagram illustrating the configuration of a structure evaluation system 100*b* according to the third embodiment. The structure evaluation system 100*b* according to the third embodiment is similar to the first embodiment except for a structure evaluation apparatus 40*b* being included instead of the structure evaluation apparatus 40. Hereinafter, the configuration of the structure evaluation apparatus 40*b* relating to differences will be described.

The structure evaluation apparatus 40*b* includes a communicator 41, a controller 42*b*, a storage 43*b*, and a display 44. The controller 42*b* controls the entire structure evaluation apparatus 40*b*. The controller 42*b* is configured using a processor such as a CPU and a memory. By executing a program, the controller 42*b* functions as an acquirer 421*b*, an event extractor 422, a position locator 423, a distribution generator 424, and an evaluator 426*b*.

Some or all of functional members including the acquirer 421*b*, the event extractor 422, the position locator 423, the distribution generator 424, and the evaluator 426*b* may be realized by hardware such as an ASIC, a PLD, or an FPGA or may be realized by software and hardware in cooperation. The program may be recorded on a computer-readable recording medium. The computer-readable recording medium, for example, is a non-transitory storage medium such as a portable medium including a flexible disk, a magneto-optical disk, a ROM, a CD-ROM, and the like, a storage device such as a hard disk built into a computer system, or the like. The program may be transmitted through a telecommunication line.

Some of the functions of the acquirer 421*b*, the event extractor 422, the position locator 423, the distribution generator 424, and the evaluator 426*b* do not need to be installed in the structure evaluation apparatus 40*b* in advance and may be realized by an additional application program being installed in the structure evaluation apparatus 40*b*.

The controller 42*b* includes the acquirer 421*b* and the evaluator 426*b* instead of the acquirer 421 and the evaluator 426 and does not include the corrector 425, which is different from the configuration of the controller 42. Hereinafter, different points will be described.

The acquirer 421*b* obtains various kinds of information. For example, the acquirer 421*b* acquires transmission data received by the communicator 41. The acquirer 421*b* stores the obtained transmission data in the storage 43*b*. In the third embodiment, the acquirer 421*b* obtains information about a structure 50 that is an evaluation target. The information about the structure 50 that is an evaluation target includes at least information of a road width of the structure 50.

The evaluator 426*b* evaluates a deterioration state of the structure 50 on the basis of an impact application frequency. More specifically, the evaluator 426*b* evaluates a deterioration state of an area of which an impact application frequency is assumed to be equal to or higher than a threshold and does not evaluate a deterioration state of an area of which an impact application frequency is assumed to be lower than the threshold. For example, the evaluator 426*b* evaluates an area of which the density of the elastic wave source is equal to or higher than a threshold in the area of which an impact application frequency is assumed to be equal to or higher than a threshold to be a sound area and evaluates an area of which the density of the elastic wave source is lower than the threshold in the area of which an impact application frequency is assumed to be equal to or higher than the threshold to be a damaged area.

The storage 43*b* stores the transmission data obtained by the acquirer 421*b* and information about the structure 50 that is an evaluation target. The storage 43*b* is configured using a storage device such as a magnetic hard disk device, a semiconductor storage device, or the like.

The flow of a deterioration state evaluation process using the structure evaluation system 100*b* according to the third embodiment will be described. In the structure evaluation system 100*b* according to the third embodiment, the evaluator 426*b* determines whether or not a condition that the road width of the structure 50 that is an evaluation target is very small is satisfied on the basis of information of the road width included in the information about the structure 50, which is an evaluation target, obtained by the acquirer 421*b*. It is assumed that the condition that the road width is very small is set in advance. For example, the condition that the road width is very small is a condition that the road width is the same as the tread width of a specific vehicle (for example, a general vehicle) or is larger than the tread width by a predetermined width (for example, +10 mm or the like). In a case in which the condition that the road width of the structure 50 that is an evaluation target is very small is satisfied, the following process is performed. On the other hand, in a case in which the condition that the road width of the structure 50 that is an evaluation target is very small is not satisfied, the following process is not performed.

In a case in which the condition that the road width of the structure 50 that is an evaluation target is very small is satisfied, the structure evaluation system 100 performs the processes of Step S101 to Step S109 illustrated in FIG. 5. Thereafter, the evaluator 426*b* evaluates a deterioration state of an area of which an impact application frequency is assumed to be equal to or higher than a threshold in the evaluation target area.

The structure evaluation system 100*c* configured as above does not evaluate a deterioration state of an area of which an impact application frequency is assumed to be lower than the threshold. In accordance with this, erroneous diagnoses can be decreased. For this reason, even in a case in which an impact applied to the road surface is not uniform, the accuracy of evaluation of the structure 50 can be improved.

Hereinafter, modified examples that are common to each embodiment will be described.

The signal processor 30 may be included in the structure evaluation apparatus s 40, 40*a*, and 40*b*.

In each of the embodiments described above, a configuration in which a plurality of sensors 20-1 to 20-*n* are connected to one signal processor 30 has been illustrated. Each of the structure evaluation systems 100, 100*a*, and 100*b* may include a plurality of signal processors 30, and the sensors 20 may be connected to different signal processors 30.

Some or all of the functional members included in each of the structure evaluation apparatus s 40, 40*a*, and 40*b* may be included in a different device. For example, the display 44 included in each of the structure evaluation apparatus s 40, 40*a*, and 40*b* may be included in a different device. In the case of configuring as such, each of the structure evaluation apparatus s 40, 40*a*, and 40*b* transmits an evaluation result to another device including the display 44. The other device including the display 44 displays the received evaluation result.

In each of the embodiments described above, a case in which a target that applies an impact that is not spatially uniform (hereinafter referred to as a non-uniform target) to the road surface is the running part of the vehicle 10 has been described as an example. In each of the embodiments described above, the non-uniform target does not need to be limited to the running part of the vehicle 10. Examples of the non-uniform target include water sprinkling vehicle, a hand cart using man power, a fixed sprinkler, and the like. Hereinafter, details will be described.

(In Case in which Non-Uniform Target is Water Sprinkling Vehicle)

Figure 11:
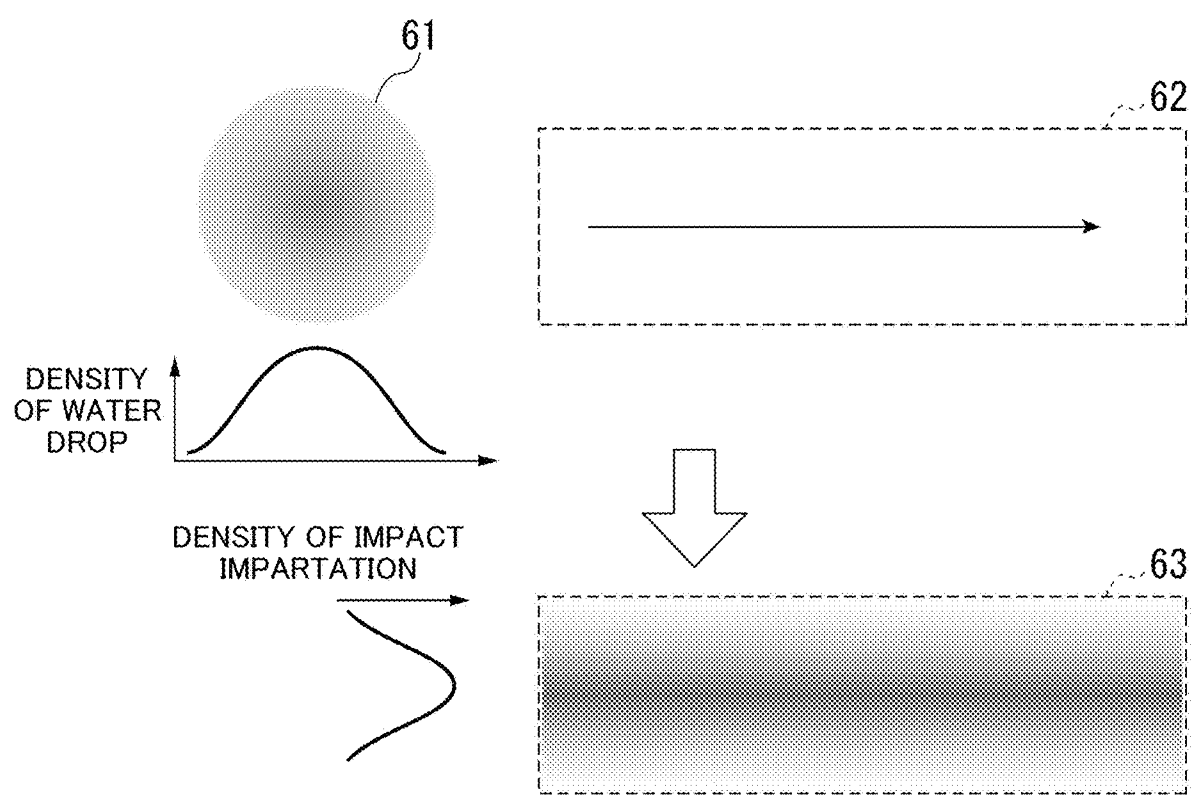
FIG. 11 is an explanatory diagram of a case in which a non-uniform target is a water sprinkling vehicle.

A water sprinkling vehicle is a vehicle that can travel a road surface while sprinkling water. For example, the water sprinkling vehicle is a vehicle to which a water sprinkling device for sprinkling water is attached on the rear side of the vehicle. The water sprinkling device sprays water drops (objects) in a distribution that becomes a normal distribution having the center of a circular area 61 illustrated in FIG. 11 as a peak. In this case, an impact applied to the road surface is water drops. FIG. 11 is an explanatory diagram of a case in which the non-uniform target is the water sprinkling vehicle.

In a case in which such a water sprinkling vehicle passes over the road surface 62 at a constant speed, a distribution 63 (for example, an elastic wave source density distribution) having the position of the road surface to which water drops are sprayed as a peak is acquired. Each of the correctors 425 and 425*a* calculates a correction value f(x, y) that can inhibit a deviation of this distribution 63. Then, each of the correctors 425 and 425*a* multiplies the elastic wave source density distribution by the calculated correction value f(x, y), thereby correcting the elastic wave source density distribution.

The application is not limited to the water sprinkling vehicle, and a person may apply an impact that is not spatially uniform to the road surface by spraying a plurality of objects such as water or ice using a predetermined method. Examples of the predetermined method include a method in which a person carries a water sprinkling device and performs sprinkling, a method in which water, ice, or the like are directly sprayed to the road surface without using a device (for example, a method in which water or ice is held by the hand and is scattered to the road surface), and the like.

By employing this configuration, it can be also applied to a situation in which an impact is applied by an object other than the running part of the vehicle 10. For this reason, the convenience can be improved.

(In Case in which Non-Uniform Target is Hand Cart)

A hand cart is a vehicle that can apply an impact to a road surface at a constant interval by traveling on the road surface using man power. For example, the hand cart is a vehicle including a hitting mechanism. The hitting mechanism, for example, is a rotary mechanism of a tooth form. When a hand cart travels a road surface using manpower, the rotary mechanism of the tooth form is brought into contact with the road surface with a constant interval, and thus the rotary mechanism of the tooth form applies an impact to the road surface.

In a case in which such a hand cart passes over the road surface, a distribution having positions of the road surface with which the rotary mechanism of the tooth form is brought into contact as peaks (for example, an elastic wave source density distribution) is acquired. Each of the correctors 425 and 425*a* calculates a correction value f(x, y) to offset the deviation of this distribution. Then, each of the correctors 425 and 425*a* corrects the elastic wave source density distribution by multiplying the elastic wave source density distribution by the calculated correction value f(x, y). In addition, the hitting mechanism is not limited to the rotary mechanism of the tooth form and may be any mechanism that can apply an impact to the road surface.

A method for applying an impact to the road surface using the hitting mechanism is not limited to the hand cart, and a method of drawing the hitting mechanism using a vehicle may be used.

By employing this configuration, it can be applied also to a situation in which an impact is applied using an object other than the running part of the vehicle 10. For this reason, the convenience can be improved.

(In Case in which Non-Uniform Target is Fixed Sprinkler)

A fixed sprinkler is a spraying device that can spray water drops in a predetermined range of a road surface at predetermined time intervals. In this case, an impact applied to the road surface is water drops. The fixed sprinkler is installed in each of a plurality of streets installed at a place other than a road on which vehicles 10 can travel. In a case in which water drops are sprayed to the road surface using such a fixed sprinkler, an impact is applied to a predetermined range of the road surface. The distribution generator 424 generates an elastic wave source density distribution on the basis of the applied impact. Since different water drops are applied to the road surface for each fixed sprinkler, the distribution generator 424 generates an elastic wave source density distribution corresponding to water drops applied from each fixed sprinkler.

Each of the correctors 425 and 425*a* calculates a correction value f(x, y) to offset the deviation corresponding to the water drops applied from each fixed sprinkler for each fixed sprinkler. Then, each of the correctors 425 and 425*a* corrects each elastic wave source density distribution by multiplying the elastic wave source density distribution corresponding to each fixed sprinkler by the calculated correction value f(x, y).

By employing this configuration, it can be applied also to a situation in which an impact is applied using an object other than the running part of the vehicle 10. For this reason, the convenience can be improved.

In each of the embodiments described above, the elastic wave source density distribution has been described as information based on position locating as an example. The information based on the position locating may be any information as long as the information can be acquired using a result of position locating. For example, the information based on the position locating may be an average amplitude. The average amplitude is calculated by averaging amplitudes of elastic waves of a first hit detected by the sensor 20 for each impact for every predetermined area. The predetermined area is an area having a size set in advance. The amplitude of the elastic wave of the first hit is used for calculating an average in a predetermined area including a position at which the elastic wave of the first hit is generated. For this reason, in a predetermined area in which an elastic wave is not generated due to no application of an impact, the average amplitude has a value close to 0.

Then, the corrector 425 corrects the value of the average amplitude for each predetermined area using a correction value f(x, y) set in correspondence with an impact. For example, the corrector 425 performs correction using a correction value f(x, y) that decreases the value of the average amplitude in a predetermined area corresponding to a passage position of the running part of the vehicle 10. The evaluator 426 evaluates a deterioration state of the structure 50 for each predetermined area on the basis of the value of the average amplitude after correction. More specifically, the evaluator 426 evaluates an area, which is a predetermined area corresponding to a passage position of the running part of the vehicle 10, of which the value of the average amplitude after correction is smaller than a threshold to be a damaged area. Whether or not an area is a predetermined area corresponding to a passage position of the running part of the vehicle 10 may be determined on the basis of the information of the tread width or may be input from the outside.

The evaluator 426 may perform evaluation as below other than the conventional evaluation technique. The evaluator 426 sets a plurality of areas of a predetermined range on the elastic wave source density distribution AD after correction. In accordance with this, the evaluator 426 divides each area on the elastic wave source density distribution AD after correction. The evaluator 426 performs comparison with the threshold 15 for each divided area (hereinafter referred to as a "divided area"). For example, the evaluator 426 compares the density of the inside of the divided area with the threshold 15. The evaluator 426 evaluates an area of which the density is lower than the threshold 15 as a result of the comparison to be a damaged area.

According to at least one of the embodiments described above, a plurality of sensors, a position locator, a corrector, and an evaluator are included. The plurality of sensors detect elastic waves generated from a structure. The position locator locates the position of a generation source of a plurality of elastic waves on the basis of the plurality of elastic waves detected by the plurality of sensors. The corrector corrects information based on the position locating performed by the position locator using a correction value set in correspondence with an impact. The evaluator evaluates a deterioration state of the structure on the basis of the corrected information. In accordance with this, even in a case in which an impact applied to the surface of a structure is not uniform, the accuracy of evaluation of the structure can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:

a plurality of sensors configured to detect elastic waves generated from a structure;

a position locator configured to locate a position of a generation sources of a plurality of elastic waves based on the plurality of elastic waves detected by the plurality of sensors;

a corrector configured to correct information based on the position locating performed by the position locator using a correction value set in correspondence with an impact; and an evaluator configured to evaluate a deterioration state of the structure based on the corrected information.

2. The structure evaluation system according to claim 1, wherein the corrector corrects the information using the correction value having one or more extreme value parts used for correcting at least information of a position at which the impact is applied.

3. The structure evaluation system according to claim 1, wherein the structure includes a road on which one or more vehicles are able to travel, and wherein the corrector corrects the information in a passage direction of the one or more vehicles using the correction value set for each width-direction distance of the road.

4. The structure evaluation system according to claim 1, wherein the structure includes a road on which one or more vehicles are able to travel, and wherein the corrector calculates the correction value based on a generation position of the impact generated in accordance with a contact between a running part of the one or more vehicles and a road surface.

5. The structure evaluation system according to claim 1, wherein the structure includes a road on which one or more vehicles are able to travel, and wherein the corrector calculates the correction value using at least information of tread widths of the one or more vehicles that have passed over the road.

6. The structure evaluation system according to claim 5, wherein the corrector calculates the correction value using information of tread widths of the one or more vehicles that have passed over the road and information of a traffic volume of the one or more vehicles on the structure.

7. The structure evaluation system according to claim 1, wherein the corrector corrects the information using the correction value acquired based on a position locating result acquired by the position locator.

8. The structure evaluation system according to claim 7, wherein the structure includes a road on which one or more vehicles are able to travel, and wherein the corrector estimates a passage position of the one or more vehicles that has passed over the road based on a position locating result acquired by the position locator and obtains the correction value based on the estimated passage position.

9. The structure evaluation system according to claim 1, wherein an impact is applied to a road surface by spraying a plurality of objects such that they are not spatially uniform, and wherein the corrector corrects the information using the correction value set in correspondence with the impact that is applied in accordance with the spraying.

10. The structure evaluation system according to claim 1, further comprising a hitting mechanism that is configured to apply an impact to a road surface at predetermined time intervals, wherein the corrector corrects the information using the correction value set in correspondence with the impact applied by the hitting mechanism.

11. The structure evaluation system according to claim 1, further comprising a spraying device that is disposed at a place other than a road on which one or more vehicles are able to travel and is configured to spray water drops in a predetermined range of the road surface, wherein the corrector corrects the information using a correction value set in correspondence with the impact applied by the spraying device.

12. The structure evaluation system according to claim 1, wherein the evaluator evaluates a deterioration state of an area of which a frequency at which the impact is applied in an evaluation target area is assumed to be equal to or higher than a threshold.

13. A structure evaluation apparatus comprising:

a position locator configured to locate a position of a generation sources of a plurality of elastic waves based on the plurality of elastic waves detected by a plurality of sensors detecting elastic waves generated from a structure;

a corrector configured to correct information based on the position locating performed by the position locator using a correction value set in correspondence with an impact; and an evaluator configured to evaluate a deterioration state of the structure based on the corrected information.

14. A structure evaluation method comprising:

locating a position of a generation sources of a plurality of elastic waves based on the plurality of elastic waves detected by a plurality of sensors detecting elastic waves generated from a structure;

correcting information based on the position locating using a correction value set in correspondence with an impact; and evaluating a deterioration state of the structure based on the corrected information.

* * * * *